March 15, 1955     P. ROBINSON ET AL     2,704,105
DIELECTRIC MATERIALS
Filed April 3, 1952
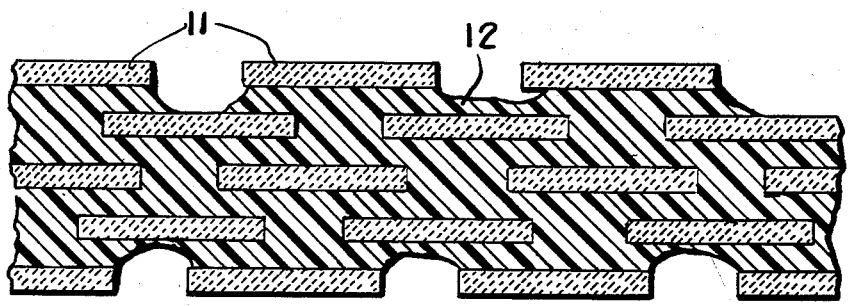
INVENTOR.
PRESTON ROBINSON AND
DAVID B. PECK
BY
Connolly and Hutz
THEIR ATTORNEYS

United States Patent Office 2,704,105
Patented Mar. 15, 1955

2,704,105

DIELECTRIC MATERIALS

Preston Robinson and David B. Peck, Williamstown, Mass., assignors to Sprague Electric Company, North Adams, Mass., a corporation of Massachusetts Application April 3, 1952, Serial No. 280,274

5 Claims. (Cl. 154—2.6)

This invention relates to improved dielectric materials and more specifically refers to relatively thin dielectric films suitable for operation at very high temperatures.

Sheets of inorganic material such as mica, in particular, and glass have for many years been used as dielectrics for capacitors and other electrical devices. The materials can be obtained by careful selection of the raw mineral, in the case of mica, or in the case of glass by special processes to give good electrical characteristics. Unfortunately, however, both mica and very thin glass sheet have been available only in limited dimensions. Further the thin films of these materials are quite expensive for use in the manufacture of capacitors and other devices.

For many years effort has been placed on the fabrication of products made up from mica flakes. This is similar to the preparation of dielectric sheets using mica with a surface imposed binder such as an alkyd resin which have been used for many years as general purpose insulation. The electrical loss in, and thicknesses available of, such sheets has not permitted their efficient use in standard types of stacked capacitors. Developments referred to above resulting in the fabrication of mica sheet possessing thicknesses on the order of 2 mils have been promising but the sheets are still relatively brittle and cannot be employed in a wound or rolled paper capacitor or about a flexible conductor despite their potential value, because of the inelastic properties of mica.

In the meantime the developments in the field of resinous materials have included such resins as polytetrafluoroethylene which can be fabricated in thicknesses suitable for use in electrical capacitors. Unfortunately, however, the material with its excellent electrical properties is subject to thermoplastic flow even at moderate temperatures, discouraging its use in thin films which will be subjected to any type of mechanical pressure during operation of the capacitor or other devices.

Mica has the advantage of being free from thermoplastic flow at elevated temperatures and of possessing fair electrical properties under these conditions. Polytetrafluoroethylene has extremely low electrical loss and exceptional thermal stability at high temperatures but is subject to the disadvantage of thermoplastic flow under these conditions.

It is an object of this invention to overcome the foregoing and related disadvantages. A further object is to produce new and useful dielectric materials suitable for use at high temperatures. A still further object is to produce high temperature capacitors with outstanding electrical properties. Another object is to produce new and improved flexible insulated conductors capable of operation at very high temperatures. Additional objects will become apparent from the following description and claims.

These objects are attained in accordance with the present invention wherein there is produced a dielectric material comprising overlapping planar sheets of inorganic dielectric material whose thickness to linear dimensions ratio is from about 1 to 3000 to about 1 to 10 dispersed in a matrix of a resinous dielectric material whose softening point is in excess of 200° C. as is shown in the drawing wherein 11 represents the inorganic dielectric material and 12 represents the resinous dielectric material. In a more restricted sense this invention is concerned with a dielectric material comprising a series of planar sheets of a substantially non-thermoplastic and overlapping dielectric film separated and bonded by a polytetrahaloethylene resin. In its preferred embodiment this invention is concerned with a thin dielectric sheet comprising a plurality of overlapping sheets of mica whose thickness does not exceed 0.2 mil and whose linear planar dimensions do not exceed 10 mils separated and bonded by a matrix of polytetrafluoroethylene resin, the dispersion of the two materials being such that the resin provides an elastic junction between the dielectric sheets.

In another presently pending case of Robinson and Peck, bearing Serial Number 204,546, filed January 5, 1951, we disclosed the preparation of dielectric materials consisting of a fibrous matrix supporting a substantially continuous resinous film. In the application referred to the matrix consists of inorganic materials as well as organic, as, for example, asbestos fibers, glass and the like. The resin films comprise polystyrene, polytetrahaloethylene resins, and similar materials with preferred electrical properties. In our invention the fiber is replaced by a planar inorganic material such as moderately small flakes of mica or itacolumite, or platelets of glass film. Other natural and synthetic inorganic materials may be employed to prevent thermoplastic flow of the organic resinous portion of the dielectric sheet even at temperatures exceeding the softening point of the resin. According to the present invention the sheets or platelets of inorganic dielectric material are oriented such that the plane of the sheet is substantially parallel to the plane of the finished dielectric material. Further, the platelets are preferably separated by the resinous dielectric material even though they overlap each other in substantially all locations within the dielectric.

Earlier in the present disclosure the development of so-called mica-papers has been described. The present invention does not encompass such materials since the sheets of mica essentially provide the inner segment of the film and the small concentration of binder that is present is imposed upon the outside as a pore impregnant. In direct contrast to the prior art our dielectric sheets employ the mica, glass or other inorganic material in a laminated and substantially uniformly dispersed fashion with the resin functioning as an elastic junction for the dielectric platelets.

In our dielectric sheets, the properties of the sheets are equal to or superior to the individual elements thereof, while in the prior art sheets, the properties were limited by the mica inelasticity. Thus in our sheet, the electrical characteristics are found to be superior to those of mica, while the physical properties are superior to polytetrafluoroethylene.

As previously indicated the types of inorganic materials which may be used in accordance with our invention are extremely varied. Solid solution material such as glass, which may be obtained in thin film form and converted into small platelets, is particularly satisfactory since it permits manufacturing control of thickness, dielectric constant and other characteristics of importance in the present invention. A number of naturally occurring minerals such as mica and itacolumite can be split or otherwise broken up into small flakes ideally suited for the present invention. Of course, many of these minerals, including mica, can be made by synthetic means. They are generally in the monoclinic series of crystalline structures.

The dimensions of the platelets are ordinarily such that the thickness to linear dimension or planar dimension ratio is between about 1 to 10 and 1 to 3000. The actual dimensions may be varied in thickness from about 0.01 to about 0.3 mil.

In the case of the mica type inorganic materials the conversion of the massive crystalline material to the small individual platelet state can be accomplished by any one of a number of means. First, the block mica may be heated to 600 or 700° C. and then quenched in water. Second, the mica can be dispersed in water by a splitting process using high speed cutting blades. Thirdly, the mica can be converted by treatment of the massive crystals under anhydrous conditions also with the aid of high speed cutting blades. The latter operation has the advantage of eliminating any effect on the charge on the crystalline planes such as may occur in water dispersion, as well as impurity defects from dispersing agents, etc. For a further elaborated discussion see "Handbook of Mica" by Chowdhury, chapter XI, entitled "Ground Mica Industry."

The ratio of resin to inorganic material applicable to my invention is in the range of from about 1:9 to about 98:2. The preferred range of operation is in the resin to platelet ratio range of from about 1:1 to about 4:1 by weight. Because of the platelet dimensions and disposition, the overlapping in even the highest resin to inorganic material range is sufficient to insure substantially complete elimination of solid resin paths through the dielectric thickness.

With reference to the resin employed in accordance with our invention, polytetrafluoroethylene is the preferred material. However, other polytetrahaloethylene resins such as polymonochlorotrifluoroethylene may be used.

The form in which the resin is employed in the manufacture of the dielectric sheets depends upon the particular fabrication process to be used. In most instances the raw resin should be in the form of a suspension of finely divided particles, at least partially cured or polymerized in a non-solvent medium such as water, ethylene glycol, hydrocarbon oils and other liquid mediums. In the case of polytetrafluoroethylene resin it is advisable to start with a water suspension of finely divided particles of resin.

The process by which the thin dielectric sheets of the invention may be produced are extremely varied. There are, however, two basic means for fabrication of the preferred embodiment of the invention as described individually in the following paragraphs.

(a) *The suspension method.*—By this method a suspension of inorganic platelets and resin particles in a medium which is a non-solvent for both of the solid dielectric materials is first produced. The suspension is then laid down on a porous or non-porous base. In the case of the non-porous type base such as a glass plate or a smooth metal belt the suspension medium is removed by drying and subsequently the particles of resin are sintered together. If the dispersion is properly made in accordance with the present invention and the suspension is allowed to settle on a smooth receiving base, it will be found that the orientation of the inorganic platelets will be in a plane substantially parallel to that of the receiving base. In the case of the porous type receiving base such as a felting pad, the porosity of the base should be such that the resin particles will not pass through the openings in the base nor appreciably clog the latter. After removal of the suspension medium and partial of complete cure of the resin particles it is desirable to pass the dielectric sheet through a calender roll to achieve maximum density in the sheet as well as the substantially continuous film of resin on at least one surface of the dielectric sheet.

(b) *The rolling method.*—In this type of process the suspension referred to above or any other uniform dispersion mixture of the final ingredients is converted into a pasty solid ordinarily containing from 5 to 40% of what will be termed a temporary lubricant, the percentage being based on the resin weight. Suitable lubricants are in general hydrocarbons having boiling points between 100° and 325° C., low vapor pressures at moderate temperatures and capable of volatilization without residual by-products. Materials, other than hydrocarbons, e. g. pine oil, having similar properties may also be utilized. In a typical example a suspension containing 40 grams of finely divided Teflon particles, 18 grams of acetone, 30 grams of mica flakelets dispersed in 250 grams of water is mixed with 250 grams of acetone, precipitating with the Teflon suspension along with the mica particles. The precipitate is then dried of water and acetone. The resulting precepitate can be converted into sheet form by passage through a calender under moderate pressure, e. g. 1000 pounds per square inch. Moreover it will be found that during the calendering operation that the mica flakelets will be oriented in the plane of the sheet. Following rolling, the acetone is evaporated off and the particles of resin sintered together to produce the final dielectric sheet.

Other means, to now be explained, exist for producing the thin dielectric film of our invention. An aqueous dispersion of the ground mica may be treated with an amount of a soluble silicate to facilitate suspension of the mica and assist in the deposition of the dielectric sheet whether this be by electrophoresis or by simple dipping. The modified mica dispersion is incorporated into the resin which is in the form of finely divided particles suspended in a non-solvent liquid medium to produce a combination suspension suitable as the starting material for the sheet formation.

The suspension of resin particles and mica is thus a uniform mixture of the two materials and as such is suitable for the preparation of the dielectric sheet or insulation. If the formation of the final dielectric layer is to be accomplished by a dipping, precipitation, or other process not involving electrophoresis, the suspension may be directly applied in the desired manner. For example, a nickel foil may be passed through the suspension to pick up a thin deposit of resin and mica particles. The layer thus deposited is heated to moderate temperatures to remove the suspension medium and finally to a temperature between about 327° C. and about 400° C. to effect sintering of the resin particles. Multilayer deposits may be made to bring the total dielectric thickness to the desired point. It is desirable at this stage of the process, though not necessary, to pass the dielectric layer, irrespective of whether it is still on the nickel foil or not, thru high pressure, high temperature calender rolls. The disposition of the mica platelets thus will take place in a manner such that the plane of their orientation is substantially parallel to that of the temporary or permanent underlying base. Thereafter the film may be stripped from the underlying base if so desired for use as an unsupported electrical tape.

A further method for producing the thin dielectric layers involves electrophoresis of the suspension of resin and mica on to a metal surface, although other conducting surfaces may be employed, such as rubber loaded with conducting particles. The voltage usually applied for the electrophoretic process is from about 3 to about 50 volts although higher voltages may be employed where the suspension resistance is high. The deposit secured when this process is followed may be such that the planes of the mica platelets do not conform to the plane of the underlying base. In such an instance it is desirable to pass the deposited layer through a high pressure calender roll prior to sintering of the individual resin particles together. In the case of cylindrical base conductor, such as a wire, it is desirable to pass the coated wire through a tapered die to secure optimum orientation of the mica platelets with respect to the underlying conductor. As the resin tends to deposit more rapidly than the mica, it is generally desirable to prepare and maintain the suspension with a higher mica-to-resin ratio than is desired in the deposit.

According to one of the limited embodiments of our invention and in view of the fact that the platelets or non-thermoplastic insulating material are substantially separated from one another by means of the resin film it is possible to produce outstanding high voltage insulating by an entirely new procedure. The individual platelets of inorganic material may be provided with a metal coating as by condensation of a metal layer on the surface thereof to provide what may be termed floating electrodes within the dielectric sheet and accordingly effecting much more uniform distribution of the voltage gradient throughout the dielectric sheet. For most practical purposes a satisfactory gain in uniformity of voltage gradient is achieved by metallizing the massive mica sheets or glass film prior to fracture thereof into the platelets.

In accordance with another embodiment of the invention lubricated suspensoid of the Teflon itself can be made the raw material for a special form of the dielectric materials of this invention. According to this process the lubricated suspensoid is initially passed through low pressure calender rolls to produce a soft unsintered sheet. At this juncture the finely divided mica platelets, preferably produced by the dry process previously described, are applied as floc onto one or both sides of the Teflon sheet. This floc applying operation will give a deposit of platelets in a random manner with the plane of crystalline orientation being non-uniform. If, however, this flocced Teflon film is then passed through a moderately high pressure calender and cured it will be found that the mica platelets will be oriented substantially entirely in the plane parallel to the film. The curing may then be effected as previously described. If the mica is introduced onto the unsintered Teflon film on but one side of the latter, a novel dielectric film will result. The resin will be substantially continuous on one side of the dielectric sheet while on the other side will be firmly integrated overlapping sheets of mica platelets.

To our knowledge there is no satisfactory dielectric sheet material capable of withstanding operating temperatures of 200° C. and higher. The novel dielectric film of our invention can be operated indefinitely at temperatures exceeding 200° C. without deterioration.

As many apparently widely different embodiments of this invention may be made without departing from the spirit and scope thereof, it is to be understood that the invention is not limited to the specific embodiments thereof except as defined in the appended claims.

We claim:

1. A flexible dielectric material capable of withstanding thermoplastic flow at temperatures up to about 200° C. comprising a plurality of spaced particles of the group consisting of glass and mica, said particles having a thickness not exceeding 0.2 mil and linear planar dimensions not exceeding 10 mils, dispersed in a resinous fluorine-containing polytetrahaloethylene binder whose softening point is in excess of 200° C., said spaced particles being in staggered relation with those of the adjacent layers.

2. The dielectric material of claim 1 wherein said spaced particles are mica.

3. The dielectric material of claim 1 wherein said spaced particles are glass.

4. A flexible dielectric material capable of withstanding thermoplastic flow at temperatures up to about 200° C. comprising a plurality of layers, each of which consists of a plurality of spaced particles of the group consisting of glass and mica, said particles having a thickness not exceeding 0.2 mil and linear planar dimensions not exceeding 10 mils, dispersed in a resinous fluorine-containing polytetrahaloethylene dielectric material whose softening point is in excess of 200° C., said spaced particles being in staggered relation with those of the adjacent layers with the weight ratio of said resinous material to said spaced particles being about 1 : 9.

5. The dielectric material of claim 4 wherein the spaced particles have a thickness to linear dimensions ratio of from about 1 to 3000 to about 1 to 10.

References Cited in the file of this patent

UNITED STATES PATENTS

| | | |
|---|---|---|
| 1,784,737 | Lloyd | Dec. 9, 1930 |
| 2,341,637 | Mansfield et al. | Feb. 15, 1944 |
| 2,392,388 | Joyce | Jan. 8, 1946 |
| 2,400,091 | Alfthan | May 14, 1946 |
| 2,427,183 | Berry | Sept. 9, 1947 |
| 2,456,251 | Boughton et al. | Dec. 14, 1948 |
| 2,538,808 | Swiss | Jan. 23, 1951 |
| 2,539,329 | Sanders | Jan. 23, 1951 |